United States Patent
George et al.

(10) Patent No.: US 7,552,255 B1
(45) Date of Patent: Jun. 23, 2009

(54) DYNAMICALLY PARTITIONING PIPELINE RESOURCES

(75) Inventors: Robert T. George, Austin, TX (US); Jason W. Brandt, Austin, TX (US); K. S. Venkatraman, Hillsboro, OR (US); Sangwook P. Kim, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1058 days.

(21) Appl. No.: 10/630,287

(22) Filed: Jul. 30, 2003

(51) Int. Cl.
 G06F 3/00 (2006.01)
 G06F 5/00 (2006.01)
 G06F 12/00 (2006.01)
 G06F 13/00 (2006.01)

(52) U.S. Cl. .............. 710/58; 710/52; 710/55; 711/169; 711/205; 711/206; 711/207; 711/208; 711/209

(58) Field of Classification Search ............ 710/58, 710/52, 55; 711/169, 205–209
See application file for complete search history.

(56) References Cited

U.S. PATENT DOCUMENTS

| | | | | |
|---|---|---|---|---|
| 5,230,045 A | * | 7/1993 | Sindhu | 711/203 |
| 6,327,646 B1 | | 12/2001 | Sharma et al. | 711/207 |
| 6,356,989 B1 | | 3/2002 | Hays et al. | 711/205 |
| 6,418,521 B1 | | 7/2002 | Mathews et al. | 711/207 |
| 6,510,508 B1 | | 1/2003 | Zuraski, Jr. et al. | 711/207 |
| 6,650,333 B1 | * | 11/2003 | Baldwin | 345/552 |

OTHER PUBLICATIONS

U.S. Appl. No. 10/630,286, filed Jul. 30, 2003, George, et al.
"A Maximum Likelihood Stereo Algorithm" Ingemar J. Cox, Sunita L. Hingoraini, Satish B. Rao. Computer Vision and Image Understanding, 63:3, pp. 542-567. May 1996.
"Fugu: Implementing Translation and protection in a Multiuser, Multimodel Multiprocessor" K. Mackenzie, J. Kubiatowicz, A Agarwal, and M. F. Kaashoek. Technical Memorandum MIT/LCS/TM503, MIT, Oct. 1994.

* cited by examiner

*Primary Examiner*—Alford W Kindred
(74) *Attorney, Agent, or Firm*—Trop, Pruner & Hu, P.C.

(57) ABSTRACT

In one embodiment of the present invention, a method includes invalidating an entry of a filter coupled to a pipeline resource if an update to the entry occurs during a first context; and flushing a portion of the pipeline resource corresponding to an address space including the entry.

20 Claims, 6 Drawing Sheets

DYNAMICALLY PARTITIONING PIPELINE RESOURCES

BACKGROUND

The present invention relates generally to data processing systems, and more particularly to partitioning of pipeline resources of a processor.

Many computer systems today use virtual memory systems to manage and allocate memory to various processes running within the system. Virtual memory allows each process running on the system to operate as if it has control of the full range of addresses provided by the system. The operating system (OS) maps the virtual address space for each process to the actual physical address space for the system. Mapping from a physical address to a virtual address is typically maintained through the use of page tables.

One way in which the performance of a processor is improved is through use of a multiple-stage pipeline architecture, in which various pipeline resources, such as caches, buffers, arrays, and the like may be used to more efficiently execute instructions. One such pipeline resource that improves use of virtual memory systems is a translation lookaside buffer (TLB). A TLB is a relatively small section of memory in a processor pipeline which caches part of the system's virtual address to physical address translations. Specifically, a few elements of the translation set are stored in the TLB which the processor can access extremely quickly.

Various TLBs may exist in a system. For example, separate TLBs may exist for instructions and data (respectively, an instruction TLB (iTLB) and a data TLB (dTLB)). More so, in certain systems a second level dTLB (STLB) may be present.

If a translation for a particular virtual address is not present in the TLB, a "translation miss" occurs and the address translation is resolved using more general mechanisms. Processing in this manner continues until a context switch occurs. A context switch may occur when a multitasking OS stops running one process (e.g., an application) and begins running another. When a context switch occurs, page tables including a page directory and a page table for the new process are loaded, and the TLB and other pipeline resources must be flushed. By flushed, it is meant that the resources' contents are cleared.

Context switches cause considerable overhead in modern microprocessors. This overhead is exacerbated by large second level TLB's that must be flushed and reloaded on every context switch. Thus this overhead can adversely impact performance, especially in systems with many active contexts. A need thus exists to more efficiently maintain pipeline resources on context switches.

DETAILED DESCRIPTION

Figure 1A:
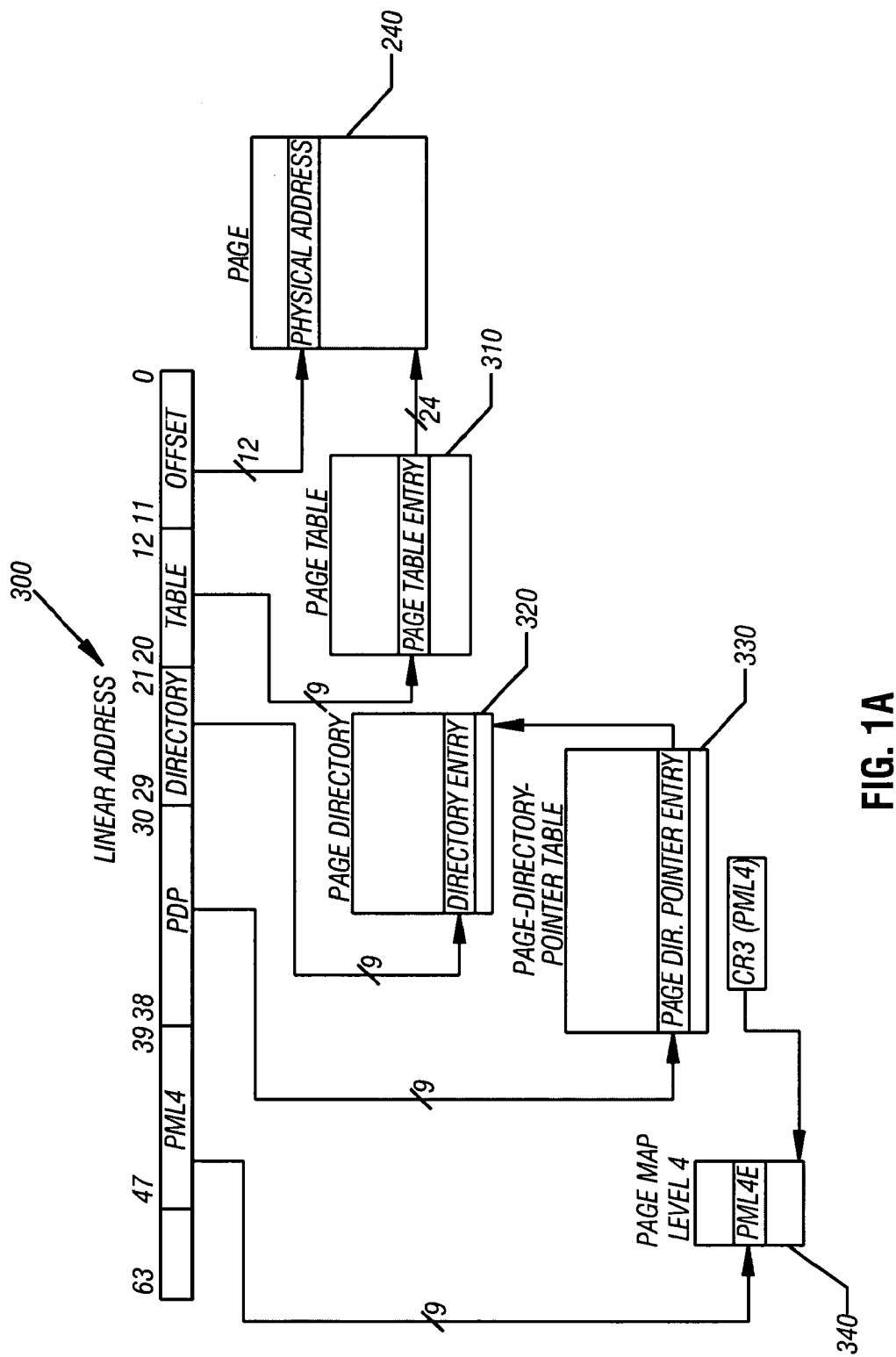
FIG. 1A is an illustration of a linear address translation in accordance with one embodiment of the present invention.

In various embodiments of the present invention, pipeline resources or structures such as TLB's, trace caches (TC), branch prediction unit (BPU) arrays, mini-tags and the like, may be dynamically partitioned to provide support for multiple address spaces. By "dynamically," it is meant that the partitioning of pipeline resources may be modified during operation such that at different times, different address spaces may occupy a given partition of a pipeline resource and/or that different partitions may consume more or less of the resource. As used herein, the term "address space" means a set of addresses in memory corresponding to a given application (e.g., a context).

In various embodiments, address spaces may be controlled by a combination of architectural control registers (e.g., control register 3 which includes a page directory base register (CR3.PDBR), a page-level cache disable bit (PCD), a page-level write through bit (PWT); control register 0, which includes a paging bit (CR0.PG), a protection enable bit (CR0.PE); control register 4, which includes a page size extension bit (CR4.PSE) and a page global enable bit and a physical address extension bit (CR4.PGE and PAE), and long mode addressing (EFER.LMA)) that determine linear to physical translations.

Various embodiments may also include a store filter (also termed a "flush filter" herein) which monitors stores for updates to page tables, and may selectively invalidate associated translations. Such page tables include entries specifying an address space. For example, for 32-bit paging, such tables include page directory entries (PDEs) and page table entries (PTEs); and page map level 4 entries (PML4Es) and page directory pointer entries (PDPEs) for 64-bit paging.

In various embodiments, address space identifiers (ASIDs) or address space numbers (ASNs) may be used to augment linear addresses in various pipeline resources with a pointer to the context with which they are associated. As used herein, an "address space identifier" or "address space number" may be any number, code, or other notation which identifies one or more address spaces with which it is associated. This allows multiple application contexts to share pipeline structures, reducing context-switch overhead. For example, when a context switch occurs, the current ASID value is changed, rather than flushing the pipeline structures. Similarly, in certain embodiments, a thread identifier (thread ID) may be provided to identify a given processor thread for a corresponding address space.

In certain embodiments, the flush filter may monitor updates to intermediate page table entries, and selectively flush TLB entries corresponding to a specific ASID. While discussed herein primarily with respect to TLB's, it is to be understood that embodiments may be applied to any pipeline resource. Various architectural events may cause a selective flush of the TLBs in accordance with embodiments of the present invention. These events include, for example, a MOV CR3 instruction; changing CR0 page mode bits: CR0.PE and CR0.PG and EFER.LMA; changing CR4 page mode bits; virtual machine (VM) Entry/Exit (if paging mode bits in CR0 or CR4 are changed); and a 32-bit context switch (if paging mode bits in CR0 or CR4 are changed). In certain embodiments, of these events, only a MOV to CR3 operation or a VMEntry/VMExit event will change/increment the ASID.

Many pipeline structures are linearly tagged or indexed. In various embodiments, ASIDs may be used to augment the linear address in these pipeline resources with a pointer to the corresponding address space. In such embodiments, the microprocessor may maintain a global current ASID register (or ASID manager) that is updated when a new address space is created or when changing to a different, previously seen address space. TLB insertions may be extended with the current ASID value, and TLB lookups match only if the ASID tag matches the current ASID value. When a context switch (e.g., a MOV CR3, or VM-Entry/Exit) triggers an address space change, the microprocessor may switch to a different ASID value that represents the new address space, instead of flushing the TLB's and other pipeline structures. In certain embodiments, selectively flushing entries corresponding to a specific address space may provide a substantial performance gain for environments with multiple contexts.

In one embodiment, a flush filter may be implemented as a content addressable memory (CAM) (e.g., a 32-entry CAM) which matches post-retirement store addresses (i.e., physical addresses) against known CR3/page directory base and page table bases to determine if the store targets a page table belonging to one of the ASID contexts.

If the flush filter finds a match, the store is attempting to update a page table entry cached in the TLB, and the flush filter provides the corresponding ASID value and thread. The associated ASID partition may then be marked as hit/modified, and the partition flush may be delayed until the next TLB flushing event. As a result, the flush filter identifies all page table updates that would change a currently cached TLB entry, and entries corresponding to a specific address space are invalidated. The resulting ASID flush (essentially a selective TLB flush) may be delayed until a context switch (i.e., a next TLB flushing event).

Referring now to FIG. 1A, shown is a linear address translation in accordance with an embodiment of the present invention accommodating 64-bit address translations. As shown in FIG. 1A, a page in a memory 240 may be addressed using a linear address 300. As shown, linear address 300 includes a number of fields to index a four-level paging structure to access a physical address in memory 240. An offset field (bits 0-11) is used to address the physical address within a page of memory 240. A page table entry (bits 12-20) addresses a page table entry in a page table (PT) 310. A page directory entry (bits 21-29) addresses a page directory entry in a page directory (PD) 320. A page directory pointer (bits 30-38) addresses a page directory pointer entry in a page directory pointer table (PDPT) 330. Finally, a page map level four (PML4) pointer (bits 39-47) addresses a PML4 entry in a PML4 340. The base of PML4 340 may be accessed using a pointer in CR3. In such manner, a 64 bit linear address may be used to implement a four-level paging structure to access a physical address.

In various embodiments, during steady state operation (i.e., after the flush filter has already been filled), the flush filter may monitor updates to page tables by filtering addresses of senior stores and external snoops. The physical address bits of these operations may be CAM'ed against the PML4/PDPT/PD/PT bases stored in the flush filter. In certain embodiments, the flush filter may maintain inclusion with an iTLB and a dTLB.

In various embodiments, the flush filter may be filled during TLB page walks. On every page walk, addresses representing page directory bases and page table bases, along with the current thread ID and ASID, may be sent to the flush filter. PTE base address writes may only occur on a PDE cache miss, thus eliminating redundant flush filter matches. If the flush filter receives a senior store or snoop address during the fill operation, the flush filter updates may be delayed until an open CAM slot is available. For each address sent to the flush filter during the fill, it may check if that address is already stored for the same (current) Thread and ASID context. If there is not an exact match (including the case where the physical address matches but the thread ID or ASID do not), then the flush filter allocates a new entry in the CAM with the address as the tag, and the thread ID and ASID as the match data, regardless of whether a global bit is set, meaning the page translation is used in another context.

Figure 1B:
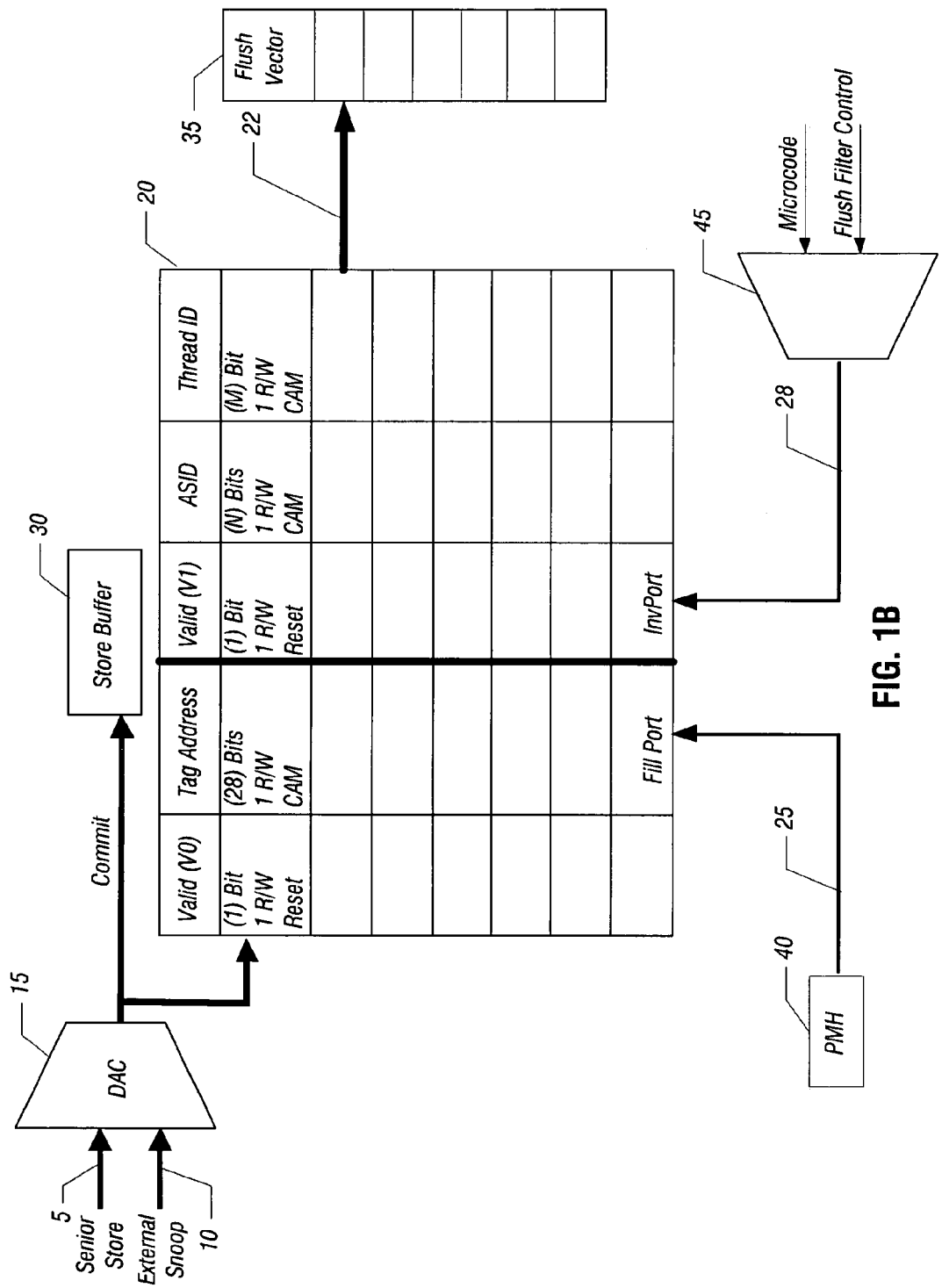
FIG. 1B is a block diagram of a flush filter in accordance with one embodiment of the present invention.

Referring now to FIG. 1B, shown is a block diagram of a flush filter in accordance with one embodiment of the present invention. As shown in FIG. 1B, a portion of a processor pipeline includes a DAC multiplexer 15, a filter 20, a store buffer 30, a flush vector control register (or "flush vector") 35, a page miss handler (PMH) 40, and a second multiplexer 45. DAC multiplexer 15 may receive senior store physical addresses 5 and external snoop physical addresses 10. In one embodiment, snoop addresses 10 may be obtained via a front-side bus of a multiprocessor system. Multiplexer 15 provides senior store addresses 5 and snoop addresses 10 to filter 20 in addition to store buffer 30. The physical (post-translation) store address (STA) from the stores and snoops may be directed to filter 20. In one embodiment, on each core clock bits [39:12] of the physical address may be presented to filter 20.

Store buffer 30 may be used to store senior store physical addresses via a commit line. Flush vector 35 may receive hits of a CAM match (i.e., tag address, ASID, and thread ID) via line 22 from filter 20. In various embodiments, flush vector 35 may have a number of entries equaling the number of entries in the filter.

As shown in the embodiment of FIG. 1B, each entry of filter 20 may include a first valid bit (V0), a tag address which, in one embodiment may be a 28-bit address of a base address of an intermediate page table, for example a page directory base, a page table base, and the like. Additionally, the entry may include a second valid bit (V1). In certain embodiments, the presence of two valid bit arrays may be used to handle filter fill operations while a particular partition of the filter is being invalidated. Entries may further include an ASID and a thread ID, which are shown as N-bit and M-bit numbers, respectively. In one embodiment, an ASID may be a two-bit number and a thread ID may be a one-bit number; however, in other embodiments these identifiers may be more or fewer bits, as desired by system architecture.

As shown in FIG. 1B, tag addresses may be stored in filter 20 via line 25 which is received in a fill port of filter 20. Such fills may occur during PMH page walks of PMH 40. In one embodiment, fills into filter 20 may occur during a fixed window, for example, in empty cycle(s) with no store/snoop accesses. In such an embodiment if a fill misses the window, the write operation to the filter may be cancelled and the corresponding flush vector may be set (as will be discussed below). Such a fill may be a paging address used on a walk when loading a new TLB entry.

As further shown in FIG. 1B, a multiplexer 45 may be coupled to filter 20 via line 28 to provide signals to an invalidate port of filter 20. In one embodiment, microcode instructions may be used to invalidate entries of filter 20. In other embodiments, a flush filter control in hardware may be used to invalidate entries.

Figure 2:
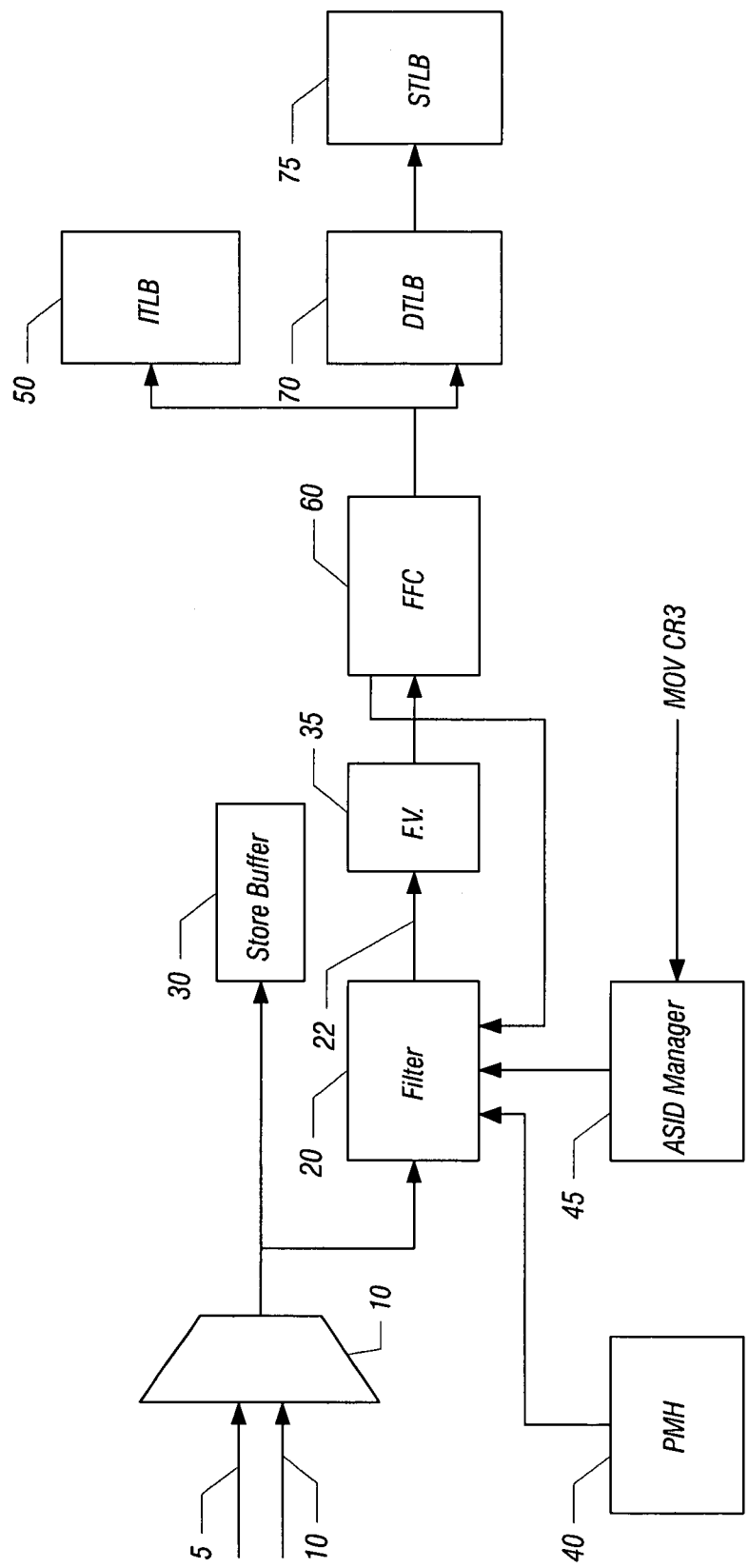
FIG. 2 is a block diagram of a flush filter system in accordance with one embodiment of the present invention.

Referring now to FIG. 2, shown is a block diagram of flush filter system in accordance with one embodiment of the present invention. As shown in FIG. 2, a flush filter 20 may receive tag addresses from page miss handler 40. For each entry filled into filter 20, an ASID manager 45 may provide a current ASID for the appropriate address space. ASID manager 45 may store various CR3 values and provide an associated ASID for a present CR3 value (i.e., context). As shown in FIG. 2, ASID manager may change ASID values when it receives MOV CR3 instructions.

When flush filter 20 compares senior store addresses or external snoops to tag addresses stored therein and a CAM match is found, a hit for the matched entry in flush vector 35 may be provided to flush filter controller 60. Flush filter controller 60 may be used to provide invalidate instructions to flush filter 20, and to send flush instructions to associated TLBs. As shown in FIG. 2, these TLBs may include an iTLB 50, a dTLB 70 and a STLB 75. Of course, these TLBs may have extended entries that include ASIDs and thread IDs.

Figure 3:
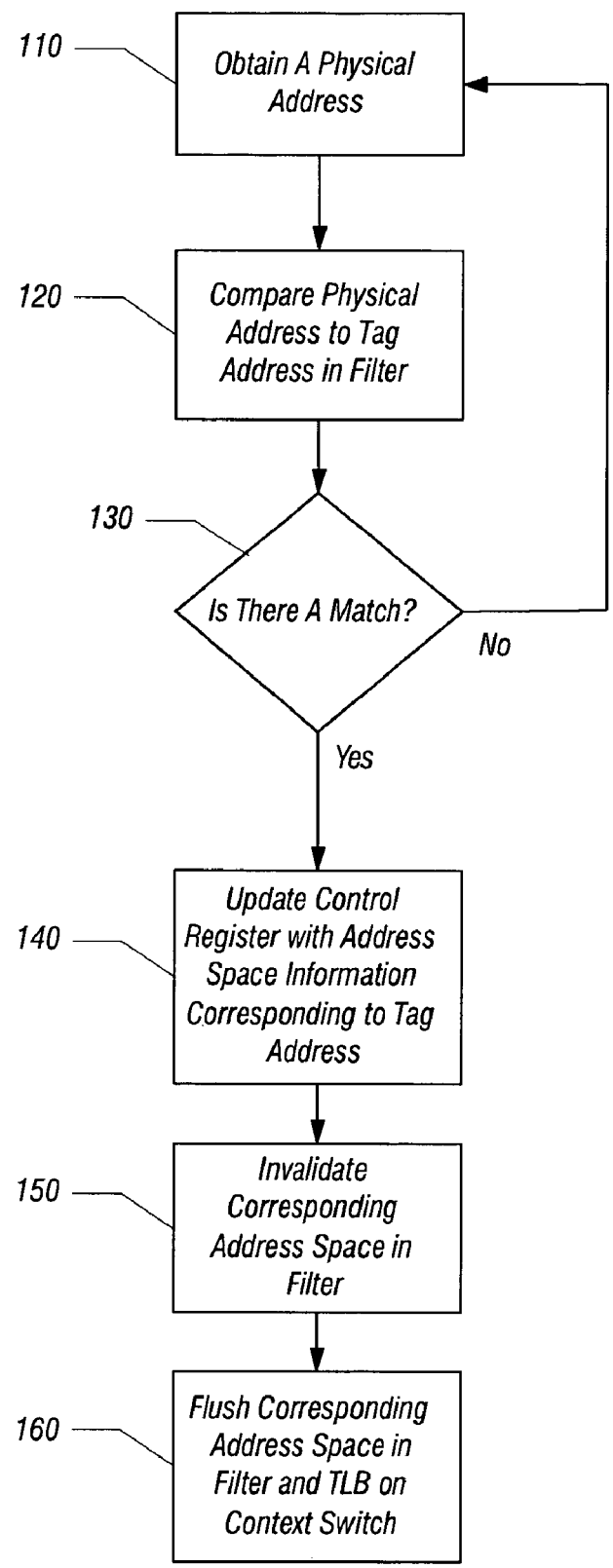
FIG. 3 is a flow diagram of a method in accordance with one embodiment of the present invention.

Referring now to FIG. 3, shown is a flow diagram of a method in accordance with one embodiment of the present invention. As shown in FIG. 3, the method begins by obtaining a physical address (block 110). As discussed above, in certain embodiments the physical address may be obtained via a multiplexer which receives senior store physical addresses and snoop addresses from an external source (e.g., a front-side bus of a multiprocessor system). Next, the filter may compare the physical address obtained to tag addresses in the filter (block 120). Such comparison may be performed to determine whether there is a match between the physical address and any of the tag addresses stored in the filter and corresponding ASID and thread ID (diamond 130). If no such matches occur, control returns to block 110 where another physical address may be obtained.

If one or more matches is found, valid bit V0 may be set if there is no conflicting invalidating access occurring, and valid bit V1 may be set if there is a conflicting invalidating access occurring. In various embodiments, the flush filter may be capable of handling invalidations while a flush is occurring. A dual ported valid (V) array or two V arrays (i.e., V0 and V1) may be used to handle CAM matches during ASID partition flushes. In such embodiments, V0 is marked as valid on the current cycle when writing a new entry in the flush filter, and V1 is marked as valid on the subsequent cycle. When the flush filter is observing writes, if one or more matches is found, valid bit V0 is read if there is no conflicting invalidating access occurring, and valid bit V1 will be read while V0 is invalidated if there is a conflicting invalidating access occurring.

If there is a match, a control register coupled to the filter may be updated (block 140). In the embodiment of FIG. 1B, the entry of flush vector 35 corresponding to the matching entry may be updated via line 22. As discussed above, because a physical address may correspond to several tag addresses having different ASID and thread IDs more than one entry in the flush vector may be updated.

Still referring to FIG. 3, the address space or spaces of the filter corresponding to the updated address spaces in flush vector 35 may be invalidated (block 150). In certain embodiments, microcode may read the contents of flush vector 35 and determine that a particular ASID and thread ID have been set and perform an invalidation process. In such a process, microcode may cause the V0 array to be invalidated at a cycle n and the V1 array to be invalidated at a cycle n+1. Further, microcode may cause flush vector 35 to be cleared. Thus for a given ASID and thread ID, when an update is detected by filter 20, entries in filter 20 corresponding to the particular ASID and thread ID may be invalidated.

Finally, on the next context switch the invalidated address space may be flushed from the filter and associated pipeline structures, such as the TLB (block 160).

In the embodiment of FIG. 3, flush filter invalidations may be ASID-based. In this embodiment, associated TLB entries are not selectively invalidated. Thus, if there is an STA hit in flush filter 20, the physical address of the store corresponds to a CR3/page directory base or PML4E or PDPTE base or a page table base stored in flush filter 20. The CAM match data provides the ASID and thread ID for the associated address space context, and flush filter 20 updates flush vector 35 to indicate that the corresponding ASID partition must be invalidated before the next TLB flushing event. In this embodiment, PTE write filtering may be disabled for the remainder of the current context. In this embodiment, the valid bits of filter 20 may eventually be cleared by microcode when the corresponding ASID partition is invalidated.

Since page tables may be shared across contexts, the flush filter CAM may find multiple hits, and several ASID bits may be set in the flush vector simultaneously. These bits corresponding to the flush filter entries' ASID partitions (e.g., bit #3 for ASID=3) may be set in the flush vector control register.

In this embodiment, the following assembly language code may be used to perform a flush.

| ST | [PTE(A)] | Detected by flush filter: FlushVector.ThreadID.ASID is marked as hit |
|---|---|---|
| ... | | |
| MOV | EAX, CR3 | TLB Flushing Event: |
| MOV | CR3, EAX | 1. flush filter entries for this ThreadID/ASID are purged; and |
| | | 2. TUB's entries associated with ThreadID/ASID are selectively flushed. |

In a second embodiment, a store writing to a PTE may trigger a selective invalidation of the corresponding TLB entries (which would allow invalidate TLB entry instructions (INVPG's) to have a no-operation effect (NOP'ed)). Since the page table base remains unchanged for a PTE write, the flush filter entry corresponding to the updated page table entry is not invalidated.

In this embodiment, the following assembly language code may be used to perform a selective invalidation.

| ST | [PTE(A)] | Detected by flush filter: PTE(A) is invalidated from all TLB'S |
|---|---|---|
| INVLPG | [A] | NOP |
| LD | [A] | Forces a page fill. |

In such an embodiment, a pointer/index between the flush filter entries and all corresponding TLB entries in the iTLB, dTLB, STLB may be used.

Figure 4:
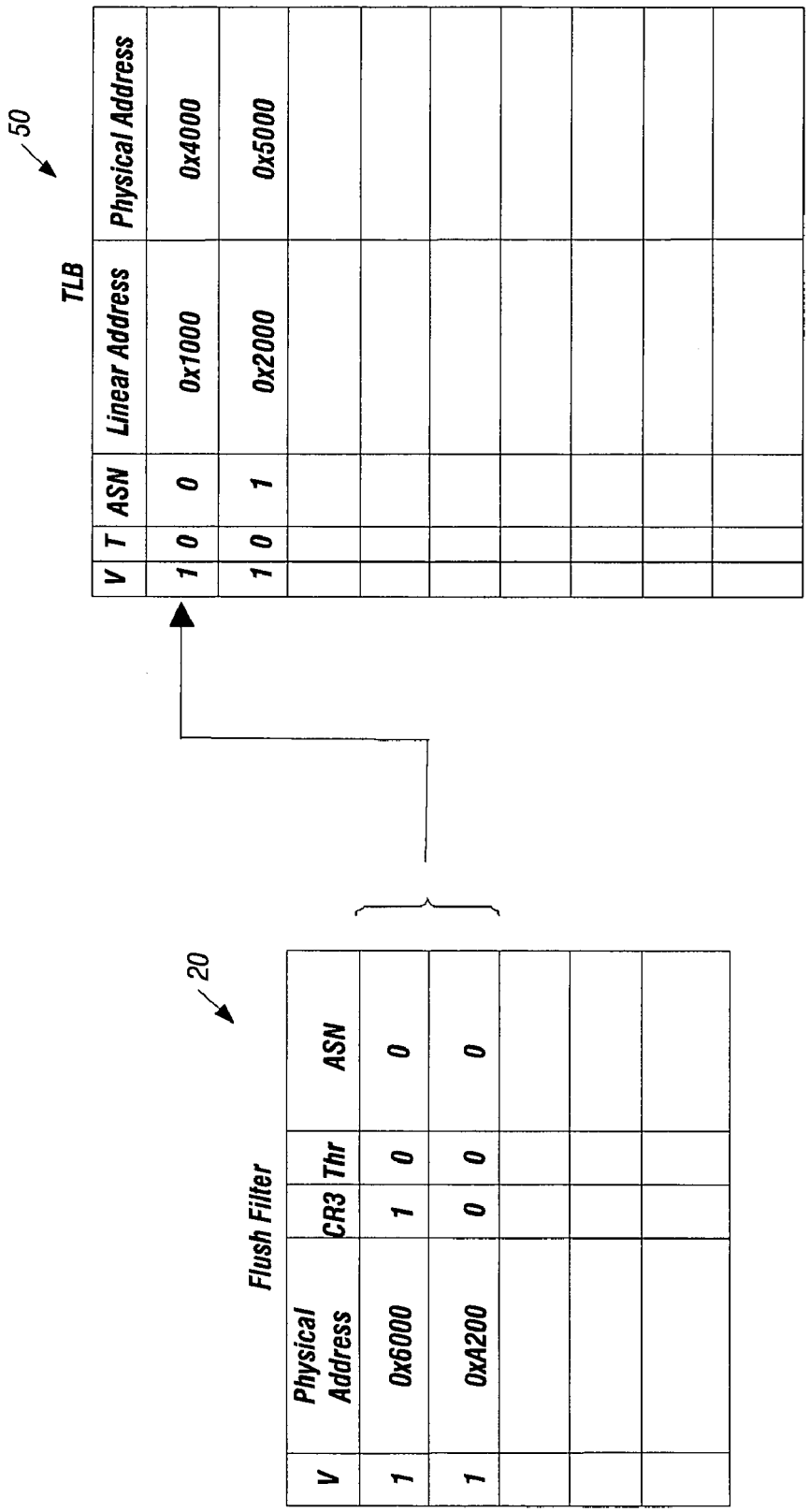
FIG. 4 is a block diagram showing correspondence between a flush filter and a TLB in accordance with an embodiment of the present invention.

Referring now to FIG. 4, shown is a block diagram showing correspondence between a flush filter and a TLB in accordance with this embodiment. As shown in FIG. 4, flush filter 20 includes physical addresses (tag addresses) and associated valid, thread ID and ASID bits (i.e., CR3 and ASN, collectively). Filter 20 may be coupled to an associated TLB 50 which is similarly augmented to include the valid bit, thread ID, and ASID, along with corresponding linear and physical addresses.

Since post-retirement senior stores contain physical addresses, it may not be known which linear address to invalidate in the TLB. However, it is possible to invalidate TLB entries based on the physical address by injecting a side-door load (4 or 8 bytes, depending on paging mode) to the physical address of the STA, which may be implemented using an additional CAM port in the TLBs.

When the PMH performs a page walk for a linear address, it stores in the flush filter, not only the physical address (high 20 bits) of the page directory and page table used but also, for entries corresponding to page tables, the high 10 bits of the linear addresses mapped by that page table (e.g., the index of that page table in the page directory). In such an embodiment, each flush filter entry may be marked as either a PD or PT.

When there is a physical write that hits the flush filter, the thread ID and ASID may be extracted and checked to determine whether the flush filter entry indicates a PD or PT. If the indication is PD (i.e., a write to PDE), all TLB entries corresponding to that thread and ASID and that are for linear addresses whose bits 31:22 match bits 11:2 of the physical address may be flushed. If the indication is PT (i.e., a write to PTE), all entries for linear addresses such that bits 31:22 match the 10 bits in the flush-filter entry and bits 21:12 match bits 11:2 in the physical address may be flushed. In long mode addressing, bits 47:22 of a linear address may be checked against corresponding bits of a physical address.

In a third embodiment, selective TLB translation updates may be effected. In such an embodiment, a TLB translation may be updated with a PTE write, instead of flushing the entry and waiting for it to re-fill. In this embodiment, the following assembly language code may be used to perform a selective update of a TLB translation.

| ST | [PTE(A)] | Detected by flush filter: PTE(A) translation is updated in all TLB's |
|---|---|---|
| INVLPG | [A] | NOP |
| LD | [A] | Uses the new translation |

In certain embodiments, a mode switch may be added to a control register (e.g., CR4) or a machine specific register that allows the OS to select the invalidation policy. However, in other embodiments the flush filter may view stores before they become senior.

In various embodiments, snoops/senior store conflict handling may be managed by a DAC multiplexer. Since the flush filter passively observes stores/snoops on the DAC pipeline, which is post side-door arbitration, conflicts are not seen. If a PMH write (which would result in a flush filter update) is observed while a senior store or snoop is in progress in the flush filter, the flush filter update corresponding to the PMH write may be stalled, and delayed until the pending CAM operation completes. In such an embodiment, if the flush filter update waits too long or another PMH write arrives, the original flush filter update may be discarded and the bit in the flush vector associated with that ASID is marked as 'hit' (i.e., will be flushed). Since page walks happen pre-retirement, microcode may prevent PMH writes (and subsequent flush filter updates) from occurring on the same thread while CR3 is changing.

Since there are a large number of possible PDP/PD base/PT base combinations for a single address space, in certain embodiments the flush filter may be partitioned to prevent a greedy application from consuming all the flush filter match slots. Two flush filter partitioning mechanisms may be applied to prevent ASID capacity issues: static partitioning and dynamic partitioning, both of which may provide for overflow conditions.

In certain embodiments, the flush filter may be segmented with a static partition per ASID. In an embodiment having a 32-entry CAM, a hard-partitioned flush filter with a 2-bit ASID per thread ID would allow 4 CR3/PD base/PT base entries per ASID/thread ID. In an embodiment having a 32-entry CAM with dynamic partitioning, a 2-bit ASID per thread ID would allow any ASID/thread ID context to consume a variable number of CR3/PD base/PT base entries.

In one embodiment, an ASID context may be allowed to occupy a number of flush filter entries proportional to the number of active ASID's. Subsequent ASID contexts would therefore occupy diminishing numbers of flush filter entries. As ASID's were least recently used (LRU'd) and re-allocated, the number of flush filter entries would balance among them, with a lower limit of 4 CR3/PD base/PT base entries per ASID/thread ID.

In another embodiment, each ASID may be assigned a minimum of 2 entries (one for PD base and one for PT base) and the remaining entries may be freely allocated on a first come, first served basis.

In yet another embodiment, each ASID may be assigned a minimum of 2 entries (one for PD base, other for PT base) and a portion of the remaining empty slots proportional to the number of active ASID may be allocated on a first come, first served basis. In such an embodiment, at least 4 entries per ASID may be assigned for long-mode paging, although in other embodiments, additional entries may be assigned.

In certain embodiments, a mechanism may be provided to handle a condition where the flush filter identifies a new PD or PT base, but the current ASID partition is full. In one embodiment, the flush filter for the ASID may be effectively disabled for this application/address space, and any new PD or PT base addresses may be ignored. For example, on a capacity miss the flush filter may be disabled because at least one active PD base or PT base has been lost.

In such an embodiment, the flush filter may mark the ASID that was attempting to add the new entries as 'hit' in the CAM flush vector for that thread. Further, the filter may not accept new PMH fill requests from an ASID context that already has its flush vector bit set, as those entries will be cleared. In this embodiment, the flush filter may not attempt to clear any TLB entries, but instead may flush the current ASID partition filter when switching to the next address space. Alternately, if any flush filter entries corresponding to a hit ASID/thread (either hit by real hit or hit by partition overflow) can be cleared, another ASID may be allocated to the cleared entries.

On an address space change (i.e., context switch), microcode may save information about the current address space/ASID (CR3, CR0 and CR4 paging bits, LMA) into a scratchpad and may compare the new address space to the stored address space information of each ASID currently tracked in the flush filter. If no stored address space/ASID matches the new address space, then the address space has not been seen before. Thus microcode must either allocate a new ASID for this address space, or choose an existing ASID to replace with an LRU policy. In the latter case, microcode may flush all entries in the flush filter for the victim ASID and the corresponding TLB entries. In either case, microcode may clear the flush vector bit for the new ASID, and mark the ASID as the current ASID.

If a CR3 write changes the PD base to a previously allocated one, microcode may be able to reuse the ASID for the previous address base. In this manner, flush filter victims may be reduced. If an ASID (including the current ASID) is found to match the new address space, then microcode may check the flush vector bit for that ASID. If the bit is set, then a page table update has occurred, and microcode may flush all entries in the flush filter and the TLB translations for that ASID, clear the flush vector bit, and mark that ASID as the current ASID. If the flush vector bit was not set, microcode only needs to mark that ASID as the current ASID.

In one embodiment, a greedy ASID invalidation mechanism may be provided to check the flush vector for the previous ASID. On each address space change, if the flush vector bit is set, microcode may flush the flush filter ASID partition, flush vector bit, and TLB translations associated with the ASID. The greedy invalidation may further check all of the flush vector bits and flush the ASID partitions and TLB translations for each ASID marked hit. In such manner, more TLB and flush filter entries may be made available for the ASID contexts that do not need to be flushed.

To reduce complexity, on infrequent TLB flushing instructions (such as context switches or changes to CR4 paging mode bits), microcode may flush all TLB entries on the current ASID instead of switching to a new ASID.

Embodiments for use in multiprocessor systems need not have TLB shootdowns (i.e., propagating page table changes to other processors) synchronize at instruction boundaries with memory-based semaphores and/or explicit inter-processor interrupt (IPI) fences. A microprocessor using a selective flush filter in accordance with one embodiment of the present invention may instead observe a TLB shootdown from one of the other microprocessors on a front-side bus to which it is coupled. Selectively updated/invalidating flush filters in accordance with one embodiment of the present invention may also allow INVLPG requests to be ignored, since PTE writes themselves are filtered.

However, in an embodiment with ASID partitioned flush filtering, PTE writes do not selectively invalidate TLB entries, and thus INVLPG's may be serviced as usual, synchronized with explicit IPI fences.

Embodiments may be implemented in a computer program that may be stored on a storage medium having instructions to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic RAMs and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device, such as a computer processor or a custom designed state machine.

Figure 5:
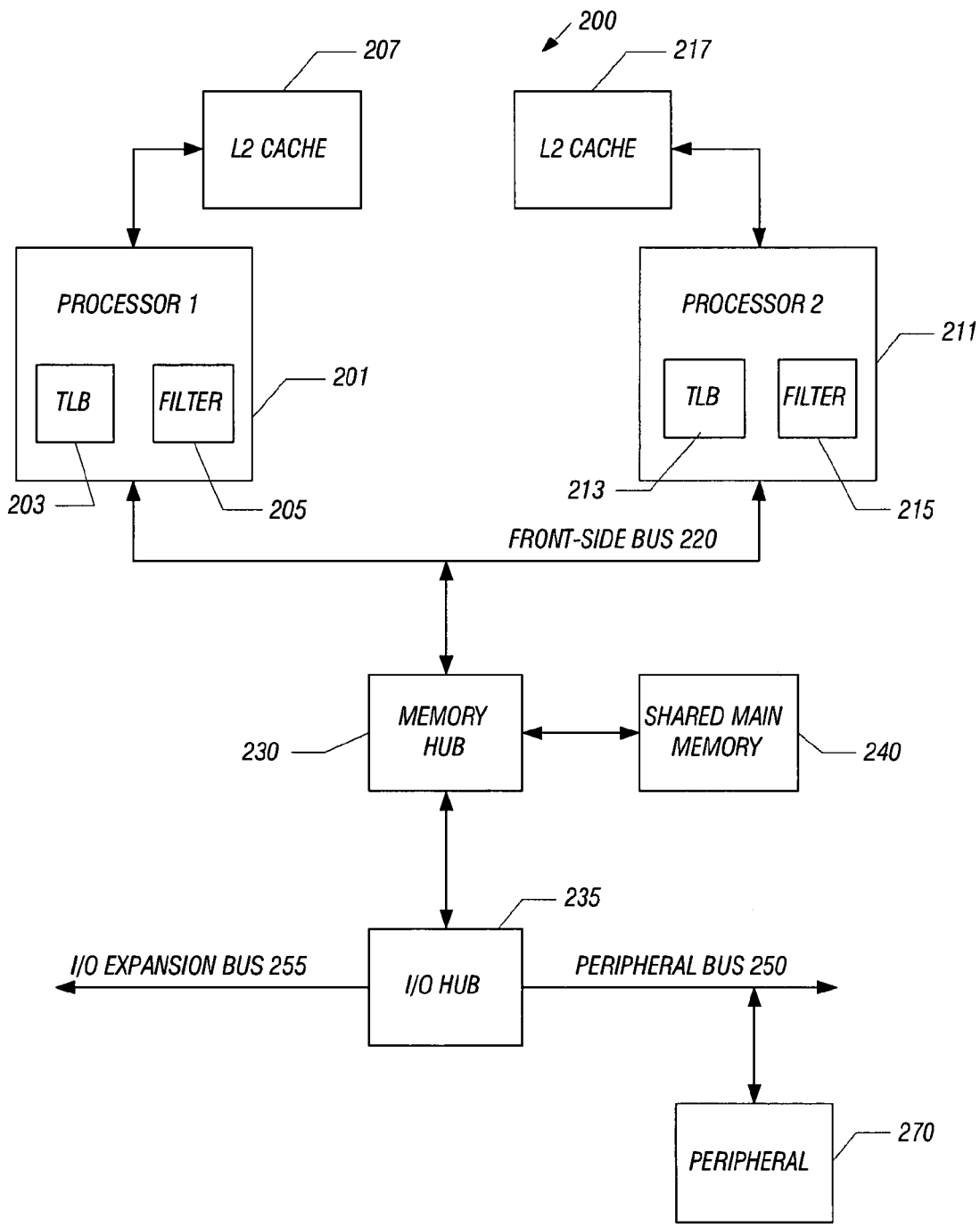
FIG. 5 is a block diagram of a multiprocessor system in accordance with one embodiment of the present invention.

Referring now to FIG. 5, shown is a block diagram of a representative multiprocessor computer system 200 in accordance with one embodiment of the invention. As shown in FIG. 5, multiprocessor computer system 200 includes a first processor 201 and a second processor 211. Processors 201 and 211 may be coupled over a front-side bus 220 to a memory hub 230 in one embodiment, which may be coupled to a shared main memory 240 via a memory bus.

Memory hub 230 may also be coupled (via a hub link) to an input/output (I/O) hub 235 that is coupled to an I/O expansion bus 255 and a peripheral bus 250. In various embodiments, I/O expansion bus 255 may be coupled to various I/O devices such as a keyboard and mouse, among other devices. Peripheral bus 250 may be coupled to various components such as peripheral device 270 which may be a memory device such as a flash memory, add-in card, and the like.

Although the description makes reference to specific components of system 200, it is contemplated that numerous modifications and variations of the described and illustrated embodiments may be possible.

As shown in FIG. 5, first processor 201 may include a TLB 203 and a filter 205 in accordance with an embodiment of the present invention. More so, a level 2 (L2) cache 207 may be coupled to processor 201. Similarly, second processor 211 may include a TLB 213, a filter 215 and may be coupled to a L2 cache 217. In one such embodiment of a multiprocessor system a cache coherency protocol such as the MESI protocol may be used. According to the MESI protocol, four states may be assigned to data elements within a cache: modified, exclusive, shared or invalid.

In an embodiment of a dual-processor system as shown in FIG. 5, first processor 201 may perform a read of the page table and get a line in an exclusive (E)-state. Later, processor 201 does a write to the page tables (through a store) and the line goes to a modify (M)-state. This does not cause a bus transaction and as a result, may not be visible on second processor 211 as an external snoop to flush filter 215, and a functional failure may result.

In one embodiment, such a failure may be avoided by temporarily changing the memory type of stores that get a flush filter hit to write-through. Alternately, a new request type may be generated from a DAC multiplexer for stores that hit the flush filter (hit information may be available in the pipeline before RB alloc), and filter 215 may ensure that it snoops this transaction on the front-side bus 220, even for a Hit E/M case.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    updating an entry of a flush vector coupled to a filter, the flush vector including an entry for each entry in the filter, if a match occurs between a corresponding entry in the filter and an address;
    invalidating the entry of the filter coupled to a pipeline resource if the update to the entry of the flush vector occurs during a context; and
    flushing a portion of the pipeline resource corresponding to an address space including the entry.

2. The method of claim 1, further comprising flushing the portion upon a switch from the context.

3. The method of claim 1, wherein the pipeline resource comprises a translation lookaside buffer.

4. The method of claim 1, further comprising comparing the address obtained from an external snoop to a plurality of entries in the filter to determine if the update has occurred.

5. The method of claim 1, further comprising flushing the portion of the pipeline resource via microcode.

6. An apparatus comprising:
    a pipeline resource having a plurality of address spaces, each of the plurality of address spaces corresponding to one of a plurality of contexts, each one of the plurality of address spaces selectively flushable while the other address spaces are maintained; and
    a filter coupled to the pipeline resource to select at least one of the plurality of address spaces to be flushed, the filter partitioned into a plurality of partitions each corresponding to one of the plurality of address spaces, wherein each partition includes a static number of entries and at least one partition includes additional dynamic entries for at least one of the plurality of address spaces.

7. The apparatus of claim 6, wherein the pipeline resource comprises a translation lookaside buffer.

8. The apparatus of claim 6, wherein the filter comprises a content addressable memory.

9. A method comprising:
dynamically partitioning a filter of a pipeline resource into a plurality of partitions, each of the partitions corresponding to one of a plurality of address spaces, wherein each of the plurality of partitions includes a fixed portion, the filter further including a dynamic portion to store entries of at least one of the plurality of address spaces.

10. The method of claim 9, further comprising sharing the pipeline resource among a plurality of applications, each corresponding to one of the plurality of address spaces.

11. The method of claim 9, further comprising allocating at least part of the dynamic portion to one of the plurality of applications that has consumed the fixed portion of one of the plurality of partitions.

12. An article comprising a machine-readable storage medium containing instructions that if executed enable a system to:
dynamically partition a filter of a pipeline resource into a plurality of partitions, each of the partitions corresponding to one of a plurality of address spaces, wherein each of the plurality of partitions includes a fixed portion, the filter further including a dynamic portion to store entries of at least one of the plurality of address spaces.

13. The article of claim 12, further comprising instructions that if executed enable the system to permit a plurality of applications, each corresponding to one of the plurality of address spaces, to share the pipeline resource.

14. The article of claim 13, further comprising instructions that if executed enable the system to allocate at least part of a dynamic portion of the filter to one of the plurality of applications that has consumed one of the plurality of partitions.

15. A system comprising:
a first processor having a pipeline resource having a plurality of address spaces, each of the plurality of address spaces corresponding to one of a plurality of contexts, each one of the plurality of address spaces selectively flushable while the other address spaces are maintained, and a filter coupled to the pipeline resource to snoop address information from a second processor, the filter to select at least one of the plurality of address spaces to be flushed, and wherein the filter is partitioned into a plurality of portions each corresponding to one of the plurality of address spaces, wherein each partition includes a static number of entries and at least one partition includes additional dynamic entries; and
a dynamic random access memory coupled to the first processor.

16. The system of claim 14, further comprising a second processor coupled to the first processor.

17. The method of claim 1, further comprising clearing the flush vector after invalidating the entry.

18. The method of claim 1, her comprising invalidating all entries of the filter corresponding to the address space.

19. The method of claim 1, wherein invalidating the entry includes invalidating a first indicator of the entry during a first cycle and invalidating a second indicator of the entry during a second cycle.

20. The apparatus of claim 6, further comprising a flush vector coupled to the filter, the flush vector including an entry for each entry in the filter, wherein an entry of the flush vector is updated if a match between an incoming address and an entry in the filter occurs.

* * * * *

UNITED STATES PATENT AND TRADEMARK OFFICE
CERTIFICATE OF CORRECTION

| | | |
|---|---|---|
| PATENT NO. | : 7,552,255 B1 | |
| APPLICATION NO. | : 10/630287 | |
| DATED | : June 23, 2009 | |
| INVENTOR(S) | : Robert T. George et al. | |

It is certified that error appears in the above-identified patent and that said Letters Patent is hereby corrected as shown below:

Col. 12:
Line 17, "claim 14" should be --claim 15--;
Line 21, "her" should be --further--.

Signed and Sealed this
Eleventh Day of September, 2012

David J. Kappos
*Director of the United States Patent and Trademark Office*